(12) United States Patent
Cetin et al.

(10) Patent No.: US 7,881,224 B2
(45) Date of Patent: Feb. 1, 2011

(54) DETECTION OF DUPLICATED NETWORK ADDRESSES

(75) Inventors: Riza Cetin, Antwerp (BE); Christian Marie Adelin Hublet, Lochristi (BE); Paul Theo Maria Reynders, Deurne (BE); Robert Nicolas Louis Peschi, Woluwe-Saint-Lambert (BE)

(73) Assignee: Alcatel-Lucent, Paris (FR)

( * ) Notice: Subject to any disclaimer, the term of this patent is extended or adjusted under 35 U.S.C. 154(b) by 600 days.

(21) Appl. No.: 11/396,571

(22) Filed: Apr. 4, 2006

(65) Prior Publication Data

US 2006/0242287 A1    Oct. 26, 2006

(30) Foreign Application Priority Data

Apr. 25, 2005    (EP)    ................... 05290919

(51) Int. Cl.
    *H04L 12/28*    (2006.01)
(52) U.S. Cl. .................. 370/254; 370/401; 709/224
(58) Field of Classification Search ................. 370/254, 370/351, 248, 255, 389–392
    See application file for complete search history.

(56) References Cited

U.S. PATENT DOCUMENTS

| | | | | |
|---|---|---|---|---|
| 5,978,373 | A * | 11/1999 | Hoff et al. ................... | 370/392 |
| 6,681,244 | B1 * | 1/2004 | Cross et al. ................. | 709/203 |
| 7,058,022 | B1 * | 6/2006 | Carolan et al. .............. | 370/254 |
| 7,246,272 | B2 * | 7/2007 | Cabezas et al. .............. | 714/53 |
| 7,274,684 | B2 * | 9/2007 | Young et al. ................ | 370/352 |
| 2003/0026230 | A1 | 2/2003 | Ibanez et al. | |
| 2005/0114515 | A1 * | 5/2005 | Droms ....................... | 709/227 |
| 2005/0152957 | A1 * | 7/2005 | Cleary et al. ................ | 424/448 |
| 2008/0092228 | A1 * | 4/2008 | Baum .......................... | 726/13 |

FOREIGN PATENT DOCUMENTS

EP    1 422 880 A1    5/2004

OTHER PUBLICATIONS

Wei Wu et al.: "Network assisted IP mobility support in wireless LANs" Network Computing and Applications, 2003. NCA, 2003. Second IEEE International Symposium on Apr. 16-18, 2003, Piscataway, NJ, USA, IEEE, Apr. 16, 2003, pp. 257-264, XP010640259.

(Continued)

*Primary Examiner*—Daniel J Ryman
*Assistant Examiner*—Tito Pham
(74) *Attorney, Agent, or Firm*—Harness, Dickey & Pierce, P.L.C.

(57) ABSTRACT

The present invention relates to an access unit for coupling a plurality of subscribers to a data communication network, and comprising an auto-configuration control unit adapted to learn, from first auto-configuration data issued by an auto-configuration server and transiting through said access unit towards a particular subscriber coupled to said access unit, a particular network address as being dynamically assigned to said particular subscriber.

An access unit according to the invention is characterized in that said auto-configuration control unit is further adapted to learn, from second auto-configuration data transiting through said data communication network, said particular network address as being newly assigned to another subscriber, and in that said access unit further comprises an auto-configuration preemption unit coupled to said auto-configuration control unit, and adapted thereupon to issue an auto-configuration control signal towards said particular subscriber, whereby a new auto-configuration session is initiated between said particular subscriber and said auto-configuration server, and further whereby a new network address is dynamically assigned to said particular subscriber.

4 Claims, 2 Drawing Sheets

OTHER PUBLICATIONS

Unknown: "TCP/IP Fundamentals for Microsoft Windows Chapter 6—Dynamic Host Configuration Protocol" Microsoft Technet, 'Online!, Mar. 9, 2005, pp. 1-28, XP002333033. Retrieved from the Internet: URL: http://www.microsoft.com/technet/itsol/utions/network/evaluate/technol/tcpipfund/tcpipfund_dh06.mspx> Retrieved on Jun. 22, 2005.

T'Joens C Hublet Alcatel P De Schrijver Mind Y: "DHCP reconfigure extension" IETF Standard, Internet Engineering Task Force, IETF, CH, Dec. 2001, XP015008982.

"Detection and Isolation of Duplicate Unique Addresses" IBM Technical Disclosure Bulletin, IBM Corp. New York, US, vol. 35, No. 6, , Nov. 1, 1992, pp. 93-96, XP000314076.

R. Droms: "Dynamic Host Configuration Protocol." Bucknell University, Oct. 1993, pp. 1-28.

\* cited by examiner

DETECTION OF DUPLICATED NETWORK ADDRESSES

FIELD OF INVENTION

The present invention relates to an access unit for coupling a plurality of subscribers to a data communication network, and comprising an auto-configuration control unit adapted to learn, from first auto-configuration data issued by an auto-configuration server and transiting through said access unit towards a particular subscriber coupled to said access unit, a particular network address as being dynamically assigned to said particular subscriber.

BACKGROUND

Dynamic Host Configuration Protocol (DHCP) allows automatic configuration of client's hosts, and more specifically dynamic assignment of network addresses. DHCP is built on a client-server model, where designated DHCP servers allocate network addresses and deliver configuration parameters to dynamically configured hosts. DHCP assigns network addresses for a finite period of time (referred to as a lease) and re-uses them once they are released, thereby postponing exhaustion of available network addresses.

An access unit provides subscribers with an access towards a data communication network. Examples of an access unit are an access multiplexer or an Ethernet bridge. The access unit typically forwards user traffic at the data link layer (L2). Yet, the access unit may snoop DHCP traffic e.g. for populating an IP anti-spoofing filter (to check whether a network address is validly used by a client).

Network addresses happen to be sometimes duplicated on account of e.g. restart or reboot of the access unit, restart or reboot of the DHCP server, thereby causing communication problems for the corresponding subscribers.

It is an object of the present invention to prevent duplication of network addresses within a data communication system.

SUMMARY

According to the invention, this object is achieved due to the fact that said auto-configuration control unit is further adapted to learn, from second auto-configuration data transiting through said data communication network, said particular network address as being newly assigned to another subscriber, and in that said access unit further comprises an auto-configuration preemption unit coupled to said auto-configuration control unit, and adapted thereupon to issue an auto-configuration control signal towards said particular subscriber, whereby a new auto-configuration session is initiated between said particular subscriber and said auto-configuration server, and further whereby a new network address is dynamically assigned to said particular subscriber.

Upon receipt of auto-configuration data instructing the access unit that a particular network address has been newly assigned, to a subscriber, the access unit checks whether this network address conflicts with the network address of a particular subscriber coupled to the access unit. If so, the access unit forces this particular subscriber to renew his network address.

An access unit according to the invention is advantageous in that duplicated network addresses are immediately detected, and in that incurred communication problems are immediately and automatically repaired.

It is to be noticed that the newly assigned network address is not declined, and that the access unit conforms with the network configuration enforced by the auto-configuration server.

It is also to be noticed that the present invention is applicable to whatever type of auto-configuration protocol, being DHCP, BOOT Protocol (BOOTP), Point-to-Point Protocol (PPP) in combination with Remote Authentication Dial-In User Service (RADIUS), etc.

An embodiment of an access unit according to the invention is characterized in that said second auto-configuration data are issued by said auto-configuration server and are transiting through said access unit towards said another subscriber, which another subscriber being coupled to said access unit.

The second auto-configuration data forms part of e.g. a DHCPACK signal issued by a DHCP server and transiting through the access unit (acting as a DHCP relay or as an intermediate switch) towards a DHCP client.

This embodiment is capable of detecting any network address that is duplicated within the scope of one access unit only.

Another embodiment of an access unit according to the invention is characterized in that said second auto-configuration data are L2-advertised by another access unit, which another subscriber being coupled to said another access unit, which access unit and which another access unit belonging to a same L2-advertising domain.

The L2-advertising domain is e.g. an Ethernet-based Local Area Network (LAN) or Virtual Local Area Network (VLAN) or Metropolitan Area Network (MAN), and the second auto-configuration data are advertised by means of e.g. a gratuitous ARP request.

This embodiment is capable of detecting any network address that is duplicated across multiple access units, yet within the scope of one L2-advertising domain.

A further embodiment of an access unit according to the invention is characterized in that said auto-configuration server is a DHCP server, and said auto-configuration control signal is a DHCPFORCERENEW message.

This embodiment is further advantageous in that it relies upon an existing DHCP control signal, thereby reducing implementation costs.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The above and other objects and features of the invention will become more apparent and the invention itself will be best understood by referring to the following description of an embodiment taken in conjunction with the accompanying drawings wherein:

DESCRIPTION OF EMBODIMENTS

Figure 1:
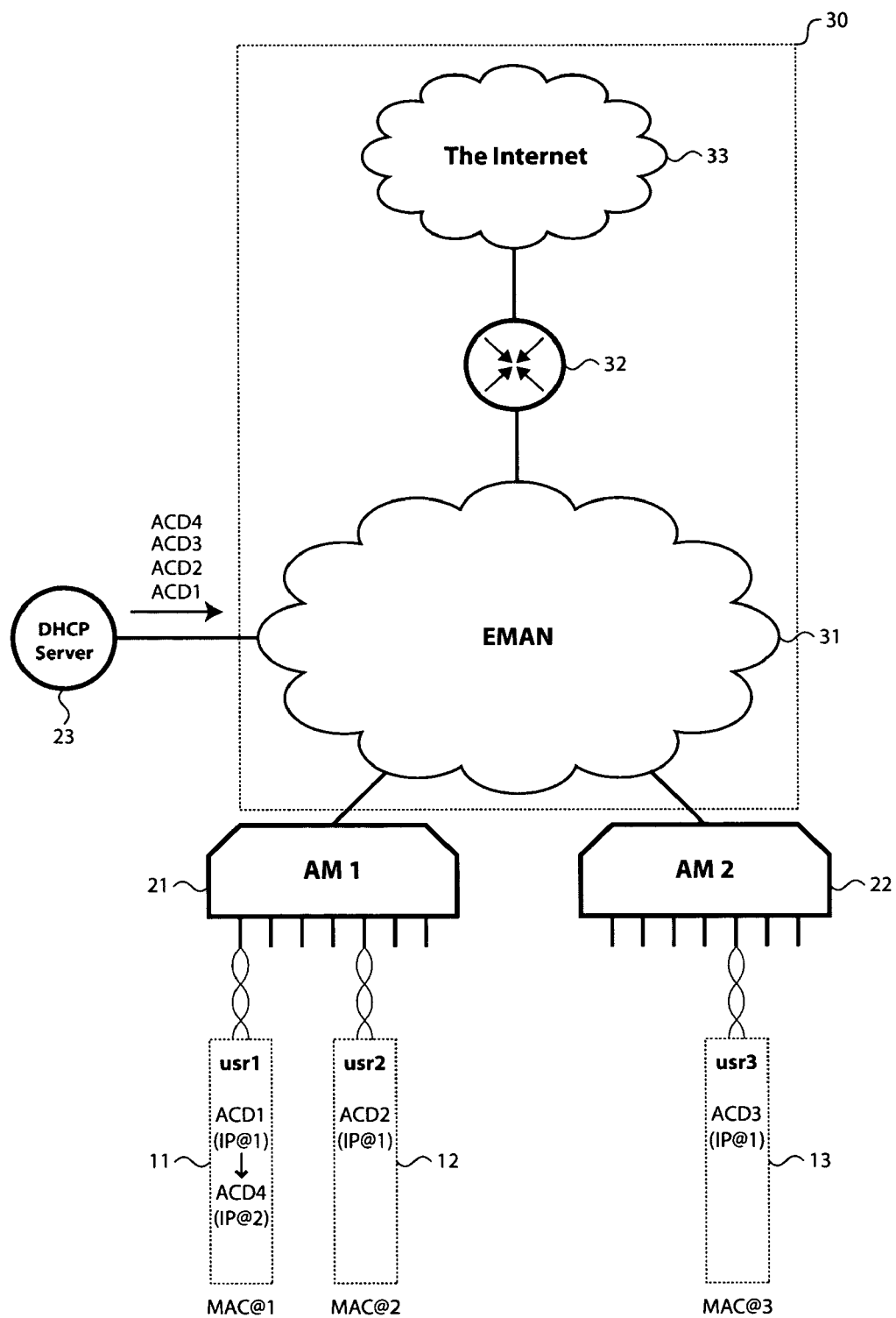
FIG. 1 represents a data communication system.

There is seen in FIG. 1 an Internet Protocol (IP)-based data communication system 1 comprising:
 Customer Premises Equipment (CPE) 11, 12 and 13 operated by subscribers usr1, usr2 and usr3 respectively,
 access multiplexers 21 (AM1) and 22 (AM2),
 a DHCP server 23,
 an Ethernet-based MAN 31 (EMAN),
 an edge router 32,
 the Internet 33.

CPE 11 and 12 are coupled to the access multiplexer 21 via twisted pairs, optical fibers or a wireless interface. CPE 13 is coupled to the access multiplexer 22. The access multiplexers 21 and 22 and the DHCP server 23 are coupled to each other via the EMAN 31. The EMAN 31 is further coupled to the Internet 33 via the edge router 32.

The EMAN 31, the edge router 32 and the Internet 33 compose a data communication network 30.

CPE 11, 12 and 13 include any piece of equipment that is assigned a public IP address, being a router, a modem, a server, a set top box, a personal computer, etc.

CPE 11, 12 and 13, together with the DHCP server 23, form part of the same IP subnet, meaning they are considered as a single route by the edge router 32 as far as IP routing is concerned.

Figure 2:
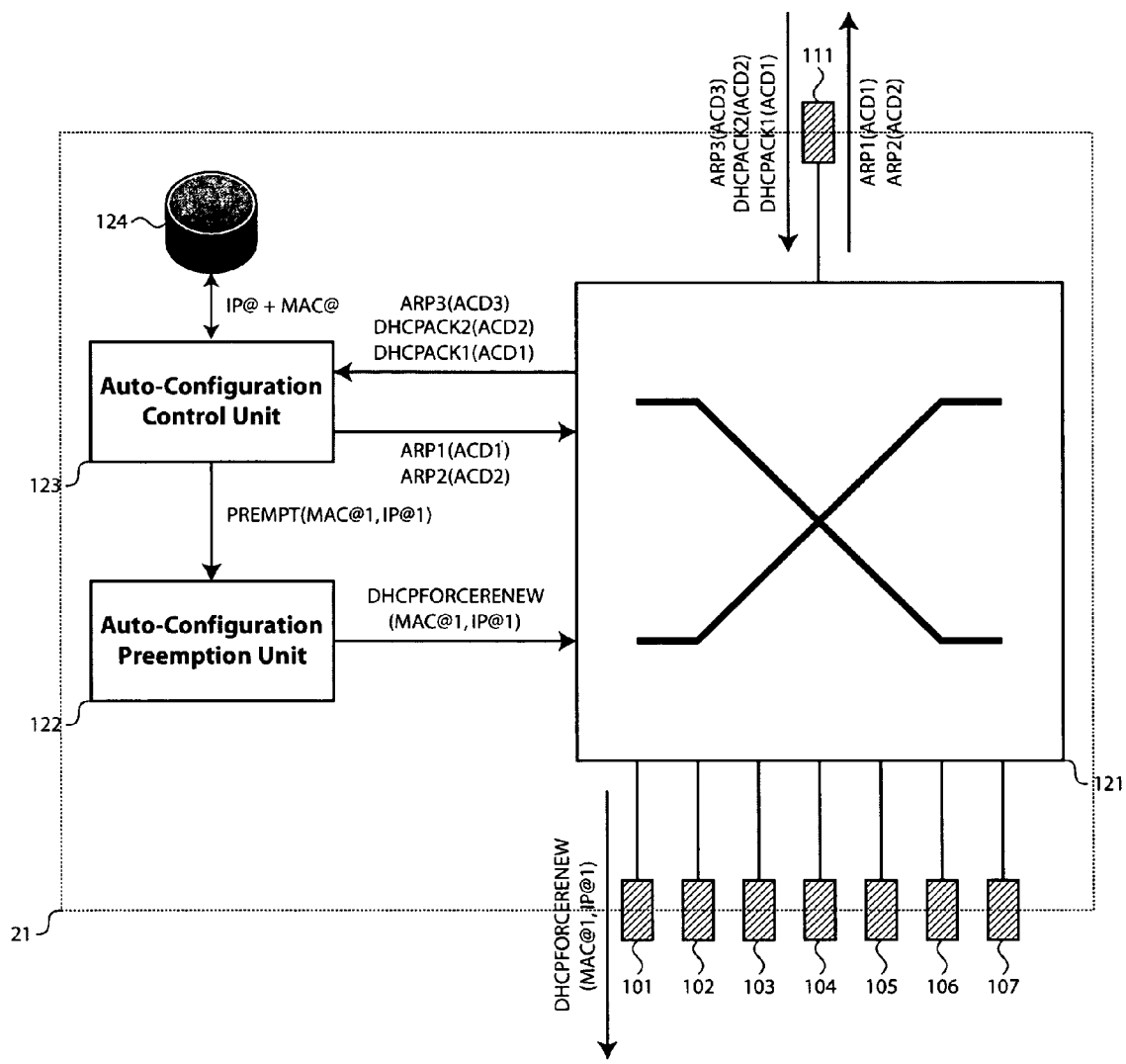
FIG. 2 represents an access unit according to the invention.

There is seen in FIG. 2 a preferred embodiment of the access multiplexer 21 comprising the following functional blocks:
 subscriber ports 101 to 107 for coupling to CPE,
 a network port 111 for coupling to a data communication network,
 an Ethernet switch 121,
 an auto-configuration preemption unit 122,
 an auto-configuration control unit 123,
 a local repository 124, wherein IP addresses are held in one-to-one relationships with MAC addresses (see IP@+MAC@ in FIG. 2).

The Ethernet switch 121 is coupled to the subscriber ports 101 to 107, to the network port 111, to the auto-configuration preemption unit 122 and to the auto-configuration control unit 123. The auto-configuration control unit 123 is further coupled to the local repository 124 and to the auto-configuration preemption unit 122.

The Ethernet switch 121 is adapted to switch any incoming Ethernet frame from any ingress port towards any egress port by means of a forwarding table. The Ethernet switch 121 learns which MAC address is associated to which port by decoding the source MAC address of the incoming frames, and populates on the fly the forwarding table with the so-learned associations.

The Ethernet switch 121 further accommodates internal port(s) (not shown) whereto the auto-configuration preemption unit 122 and the auto-configuration control unit 123 are coupled for receiving and transmitting frames from and to the data communication system 1.

The Ethernet switch 121 is further adapted to forward a copy of DHCP and ARP traffic received through the network port 111 towards the auto-configuration control unit 123 for further processing.

The auto-configuration control unit 123 is adapted to decode auto-configuration data from DHCP and ARP traffic.

The auto-configuration control unit 123 is further adapted to validate a MAC addresses as being a MAC address of a subscriber coupled to the access multiplexer 21 (further referred to as a local MAC address or as a local subscriber). This information can be retrieved e.g. by reading out the forwarding table and by validating the MAC addresses that have been learnt as being associated with any of the subscriber ports 101 to 107.

The auto-configuration control unit 123 is further adapted to check whether a newly-assigned IP address conflicts with the IP address of a local subscriber, and if so to request the auto-configuration preemption unit 122 to preempt the corresponding DHCP session.

The auto-configuration control unit 123 is further adapted to update the local repository 124 (add a new entry, update or delete an existing entry) according to the so-decoded auto-configuration data, and to broadcast gratuitous ARP requests throughout the EMAN 31 whenever a local subscriber is assigned a new IP address.

The auto-configuration preemption unit 122 is adapted to issue a DHCPFORCERENEW signal under control of, and by making use of the information provided by, the auto-configuration control unit 123.

An operation of the preferred embodiment follows.

Initially, CPE 11 (more specifically, a DHCP client housed by CPE 11) initiates a DHCP session to obtain network configuration parameters from a DHCP server. The network configuration parameters includes a public IP address, primary and secondary Domain Name Server's (DNS) IP addresses, gateway's IP address, the applicable MTU size, etc.

The DHCP session is initiated by broadcasting a DHCP-DISCOVER message (not shown), which DHCP message being relayed by the access multiplexer 21 towards the EMAN 31. The DHCP session goes on by exchanging further DHCP messages (DHCPOFFER, DHCPREQUEST), and terminates with the DHCP server 23 returning a DHCPACK1 message to the DHCP client. The DHCPACK1 message contains, as auto-configuration data ACD1 and as far as the present invention is concerned, a public IP address IP@1 associated with a particular MAC address MAC@1 uniquely identifying CPE 11.

The Ethernet switch 121 forwards a copy of the DHCPACK1 message towards the auto-configuration control unit 123.

Next, the auto-configuration control unit 123 checks throughout the local repository 124 whether the IP address IP@1 conflicts with another local subscriber's IP address, that is to say whether the IP address IP@1 is already held in the local repository 124 as being associated to another local MAC address. Presently, there is no such IP address.

The auto-configuration control unit 123 validates the MAC@1 as being a local MAC address, creates a new entry in the local repository 124 wherein the IP address IP@1 is associated with the MAC address MAC@1, and next broadcasts a gratuitous ARP request ARP1 through the network port 111, and further throughout the EMAN 31, whereby the IP address IP@1 is advertised as being associated with the MAC address MAC@1.

Let us assume, as a first working assumption, that the DHCP server 23 accidentally re-assigns the IP address IP@1 to the local subscriber usr2 during a further DHCP session, meaning that a further-received DHCPACK2 message contains, as configuration data ACD2, the IP address IP@1 associated with another MAC address MAC@2 uniquely identifying CPE 12.

A copy of the DHCPACK2 message is forwarded towards the auto-configuration control unit 123.

The auto-configuration control unit 123 checks throughout the local repository 124 whether the IP address IP@1 conflicts with another local subscriber's IP address. Presently, the auto-configuration control unit 123 identifies the local MAC address MAC@1 as being already associated with the IP address IP@1. Thus, the auto-configuration control unit 123 sends a trigger PREMPT to the auto-configuration preemption unit 122 with MAC@1 and IP@1 as target MAC and IP address respectively.

The auto-configuration control unit 123 validates the MAC address MAC@2 as being a local MAC address, updates the corresponding entry in the local repository 124 by re-associating the IP address IP@1 with the MAC address MAC@2, and broadcasts a gratuitous ARP request ARP2 through the network port 111, and further throughout the EMAN 31, whereby the new association between the IP address IP@1 and the MAC address MAC@2 is advertised.

Upon receipt of the trigger PREMPT, the auto-configuration preemption unit 122 sends a DHCPFORCERENEW message with MAC@1 and IP@1 as destination MAC and IP address respectively, thereby forcing the corresponding device to re-initiate a new DHCP session, and further to get new auto-configuration data ACD4 including a new IP address IP@2.

Let us assume, as a second working assumption, that the DHCP server 23 accidentally re-assigns the IP address IP@1 to the subscriber usr3 during a further DHCP session. The access multiplexer 22 broadcasts a gratuitous ARP request ARP3 throughout the EMAN 31, whereby the IP address IP@1 is advertised as being associated with a MAC address MAC@3 uniquely identifying CPE 13 (ACD3).

A copy of the ARP3 message is forwarded to the auto-configuration control unit 123.

The auto-configuration control unit 123 checks throughout the local repository 124 whether the IP address IP@1 conflicts with a local subscriber's IP address. Presently, the auto-configuration control unit 123 identifies the local MAC address MAC@1 as being already associated with the IP address IP@1. Thus, the auto-configuration control unit 123 sends a trigger PREMPT to the auto-configuration preemption unit 122 with MAC@1 and IP@1 as target MAC and IP address respectively.

The auto-configuration control unit 123 does not validate the MAC address MAC@3 as being a local MAC address, and thus deletes the entry associating the IP address IP@1 to the local MAC address MAC@1 from the local repository 124.

Upon receipt of the trigger PREMPT, the auto-configuration preemption unit 122 sends a DHCPFORCERENEW message with MAC@1 and IP@1 as destination MAC and IP address respectively, thereby forcing the corresponding device to re-initiate a new DHCP session, and further to get new auto-configuration data ACD4 including a new IP address IP@2.

It is to be noticed that gratuitous ARPs may also be issued by CPE upon assignment of a new IP address, e.g. for dealing with local address conflicts. Yet, such ARPs are dropped by the access multiplexer for security issues (ARP poisoning, ARP flooding, etc). The present invention offers an alternative and wide-scope solution for fixing duplicated network addresses, while keeping network security alike.

In an alternative embodiment of the present invention, the access multiplexers 21 and 22 acts as gateway routers towards the edge router 32, and further towards the Internet 33. As such, they are assigned public IP addresses.

The access multiplexers 21 and 22 acts as DHCP relays, and push their own IP address before forwarding upstream DHCP messages towards the DHCP server 23. In this way, the server can return them downstream DHCP messages, for further forwarding towards the appropriate destination.

In an alternative embodiment, PPP in combination with RADIUS is used in lieu of DHCP.

The access multiplexers 21 and 22 terminate the PPP sessions and collaborate with a RADIUS server for authenticating the subscribers, which RADIUS server providing back network configuration parameters (possibly in collaboration with a third-party server) to the access multiplexers for encapsulation and further forwarding towards the subscribers.

The local repository 123 is populated upon receipt of RADIUSACCESSACCEPT messages, wherein auto-configuration data are encoded (in lieu of DHCPACK messages).

It is to be noticed that the present invention is not restricted to Ethernet-based data communication systems, but is applicable to whatever type of link layer protocol, being token ring, Asynchronous Transfer Mode (ATM) with dedicated ATM circuit(s) for advertising auto-configuration data to peer access units and with dedicated advertising messages, etc.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. An access unit for coupling a plurality of subscribers to a data communication network, said access unit comprising:
an auto-configuration control unit, including an associated processor and memory, and configured to learn,
from first auto-configuration data issued by an auto-configuration server and transiting through said access unit to first subscriber coupled to said access unit, a first network address dynamically assigned to said first subscriber, and
from second auto-configuration data transiting through said data communication network, a second network address assigned to a second subscriber, the second network address being assigned and arriving at the access unit later in time as compared to the first network address; and
an auto-configuration preemption unit, including an associated processor and memory, and coupled to said auto-configuration control unit, and configured to issue an auto-configuration control signal to said first subscriber if said first network address is a same network address as said second network address, the auto configuration control signal forcing a new auto-configuration session to be initiated between said first subscriber and said auto-configuration server and forcing a new network address to be dynamically assigned to said first subscriber.

2. The access unit according to claim 1, wherein said second auto-configuration data are issued by said auto-configuration server and are transiting through said access unit to said second subscriber, said second subscriber being coupled to said access unit.

3. The access unit according to claim 1, wherein said second auto-configuration data are Layer 2-advertised by another access unit, said second subscriber being coupled to said another access unit, said access unit and said another access unit belonging to a same Layer 2-advertising domain.

4. The access unit according to claim 1, wherein said auto-configuration server is a DHCP server, and said auto-configuration control signal is a DHCPFORCERENEW message.

* * * * *